United States Patent
Trindade et al.

(10) Patent No.: US 8,105,031 B2
(45) Date of Patent: Jan. 31, 2012

(54) COOLING ARRANGEMENT FOR TURBINE COMPONENTS

(75) Inventors: Ricardo Trindade, Coventry, CT (US);
Bryan P. Dube, Columbia, CT (US);
William Abdel-Messeh, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 1057 days.

(21) Appl. No.: 11/971,932

(22) Filed: Jan. 10, 2008

(65) Prior Publication Data

US 2009/0180861 A1 Jul. 16, 2009

(51) Int. Cl.
*F01D 5/18* (2006.01)
(52) U.S. Cl. ....................................... 416/97 R
(58) Field of Classification Search ................ 416/96 R, 416/97 R, 97 A
See application file for complete search history.

(56) References Cited

U.S. PATENT DOCUMENTS

| | | | | |
|---|---|---|---|---|
| 4,596,281 A * | 6/1986 | Bishop | ............ | 164/32 |
| 4,753,575 A | 6/1988 | Levengood | | |
| 5,387,086 A * | 2/1995 | Frey et al. | .................. | 416/97 R |
| 5,496,151 A | 3/1996 | Coudray | | |
| 5,669,759 A | 9/1997 | Beabout | | |
| 5,720,431 A | 2/1998 | Sellers | | |
| 5,779,437 A | 7/1998 | Abdel-Messeh | | |
| 5,813,836 A * | 9/1998 | Starkweather | .............. | 416/97 R |
| 5,931,638 A | 8/1999 | Krause | | |
| 6,206,638 B1 | 3/2001 | Glynn | | |
| 6,474,947 B1 | 11/2002 | Yuri | | |
| 6,491,496 B2 * | 12/2002 | Starkweather | .............. | 416/97 R |
| 6,672,836 B2 * | 1/2004 | Merry | .......................... | 416/97 R |
| 6,955,523 B2 | 10/2005 | McClelland | | |
| 7,114,923 B2 | 10/2006 | Liang | | |
| 7,137,780 B2 * | 11/2006 | Liang | .......................... | 416/90 R |
| 7,223,072 B2 | 5/2007 | Riahi | | |
| 7,232,290 B2 | 6/2007 | Draper | | |
| 7,249,934 B2 * | 7/2007 | Palmer et al. | ............... | 416/97 R |

* cited by examiner

*Primary Examiner* — Nathaniel Wiehe
(74) *Attorney, Agent, or Firm* — Carlson, Gaskey & Olds, P.C.

(57) ABSTRACT

A turbine component includes an aft cooling circuit that extends between a turbine midsection and a turbine trailing end. The aft cooling circuit includes a trailing end section proximate the trailing end, a first interior section proximate the turbine midsection, and a first intermediate section fluidly connected between the trailing end section and the first interior section. A forward cooling circuit of the turbine component extends between the turbine midsection and a turbine leading end. The forward cooling circuit includes a leading end section proximate the leading end, a second interior section proximate the turbine midsection, and a plurality of second intermediate sections fluidly connected between the leading end section and the second interior section. The leading end section, the second intermediate section, the first intermediate section, and the trailing end section each include a plurality of coolant discharge openings for facilitating cooling of the turbine component.

17 Claims, 2 Drawing Sheets the various features and advantages of this invention will become apparent to those skilled in the art from the following detailed description of the currently preferred embodiment. The drawings that accompany the detailed description can be briefly described as follows.

COOLING ARRANGEMENT FOR TURBINE COMPONENTS

BACKGROUND OF THE INVENTION

This disclosure relates to an arrangement of coolant discharge openings of a turbine component used in a gas turbine engine.

Gas turbine engines are commonly used for propelling an aircraft, for example. A conventional gas turbine engine includes a compressor section, a combustion section, and a turbine section having turbine blades and turbine vanes. The compressor section compresses air, which is mixed with fuel and burned in the combustion section to produce a hot gas stream that expands in the turbine section. Thus, the turbine blades and vanes operate within a relatively hot environment.

SUMMARY OF THE INVENTION

The disclosed example turbine components and gas turbine engine include a cooling arrangement that facilitates cooling of the turbine components.

An example turbine component includes an aft cooling circuit that extends between a turbine midsection and a turbine trailing end. The aft cooling circuit includes a trailing end section proximate the trailing end, a first interior section proximate the turbine midsection, and a first intermediate section fluidly connected between the trailing end section and the first interior section. A forward cooling circuit extends between the turbine midsection and a turbine leading end. The forward cooling circuit includes a leading end section proximate the leading end, a second interior section proximate the turbine midsection, and a plurality of second intermediate sections fluidly connected between the leading end section and the second interior section. The leading end section, the second intermediate section, the first intermediate section, and the trailing end section each include a plurality of coolant discharge openings for facilitating cooling of the turbine component.

In a further example, the turbine component includes coolant discharge openings only in the leading end section, one of the plurality of second intermediate sections, the first intermediate section, and the trailing end section.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
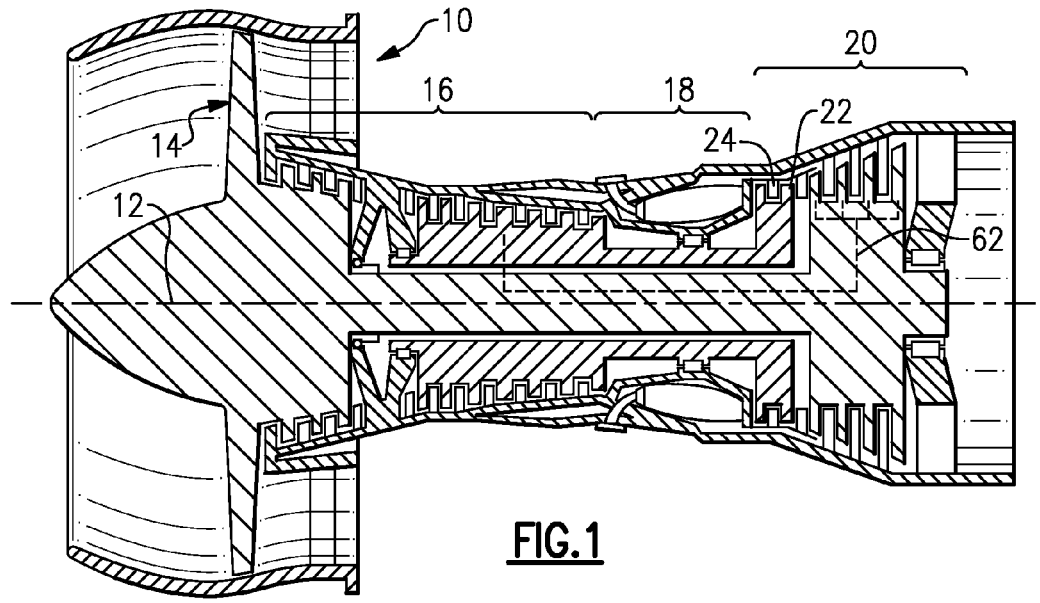
FIG. 1 illustrates an example gas turbine engine.

FIG. 1 illustrates selected portions of an example gas turbine engine 10, such as a gas turbine engine 10 used for propulsion. In this example, the gas turbine engine 10 is circumferentially disposed about an engine centerline 12. The engine 10 in this example includes a fan 14, a compressor section 16, a combustion section 18, and a turbine section 20 that includes turbine blades 22 and turbine vanes 24. As is known, air compressed in the compressor section 16 is mixed with fuel that is burned in the combustion section 18 to produce hot gasses that are expanded in the turbine section 20 to drive the fan 14. FIG. 1 is a schematic presentation for illustrative purposes only and is not a limitation on the disclosed examples. Additionally, there are various types of gas turbine engines, many of which could benefit from the examples disclosed herein.

Figure 2:
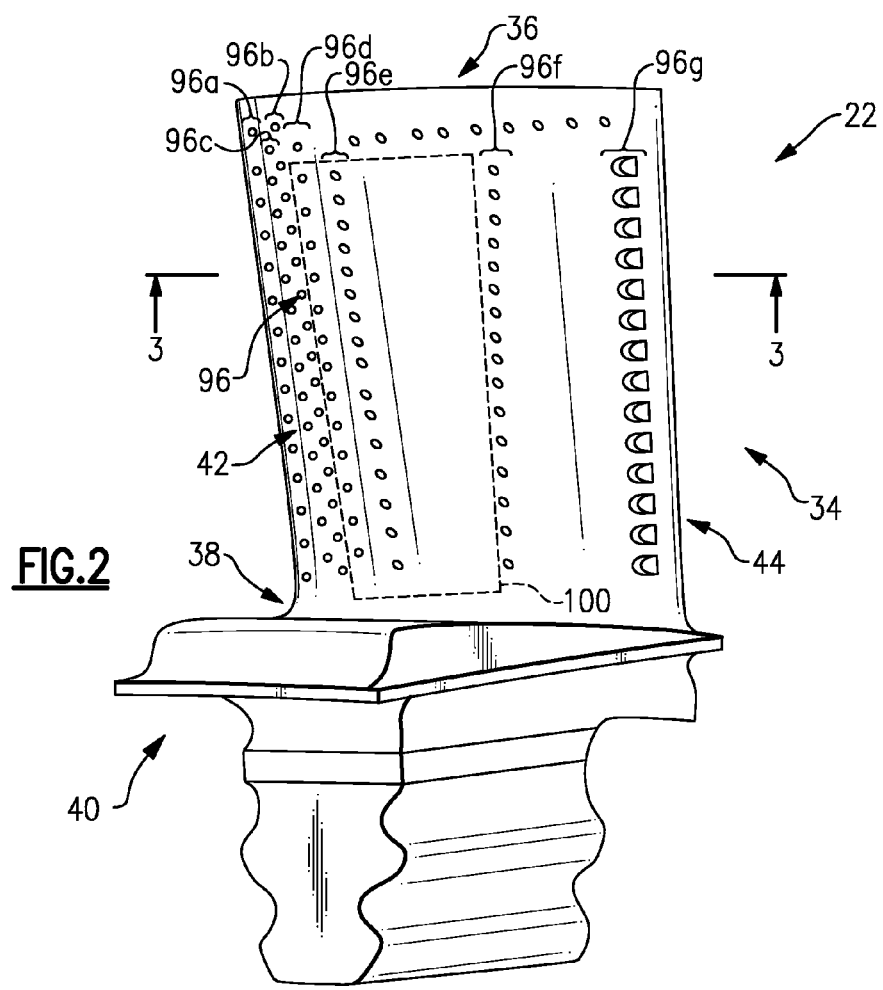
FIG. 2 illustrates an example turbine blade of the gas turbine engine.
Figure 3:
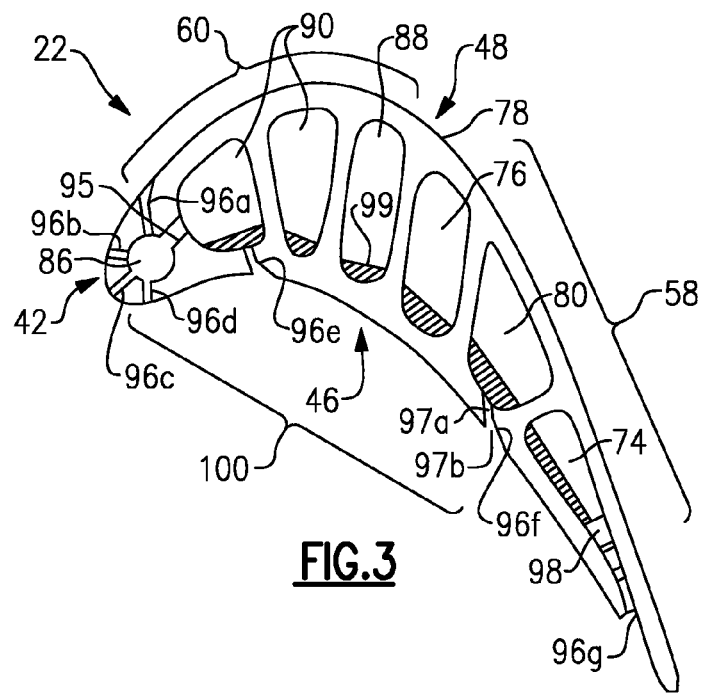
FIG. 3 illustrates a cross-section of the turbine blade.

FIGS. 2 and 3 illustrate examples of one of the turbine blades 22 shown in FIG. 1. Although the description below is made with reference to the turbine blade 22, it is to be understood that the examples may also be applied to other airfoil shaped components that may require cooling, such as the turbine vanes 24.

The turbine blade 22 includes an airfoil section 34 that extends between a tip 36 and a base 38. The airfoil section 34 is secured to a platform section 40 at the base 38. The airfoil section 34 includes a leading end 42 (e.g., edge) that is generally oriented forward in the gas turbine engine 10 relative to flow through the gas turbine engine 10, and a trailing end 44 (e.g., edge) that is oriented downstream from the leading end 42. The airfoil shape of the airfoil section 34 also includes a pressure side 46 and a suction side 48 that refer to relative pressures created when the hot gas stream from the combustion section 18 flows over the airfoil shape of the airfoil section 34.

The turbine blade 22 also includes an aft cooling passage 58 (i.e., circuit) and a forward cooling passage 60 (i.e., circuit) for facilitating cooling of the turbine blade 22. The cooling passages 58 and 60 are fluidly connected with the compressor section 16 to receive a bleed flow 62 (FIG. 1) of relatively cool air that functions as a coolant to internally cool the turbine blade 22 and provide film cooling over the outer surfaces of the turbine blade 22, as will be described below.

Figure 4:
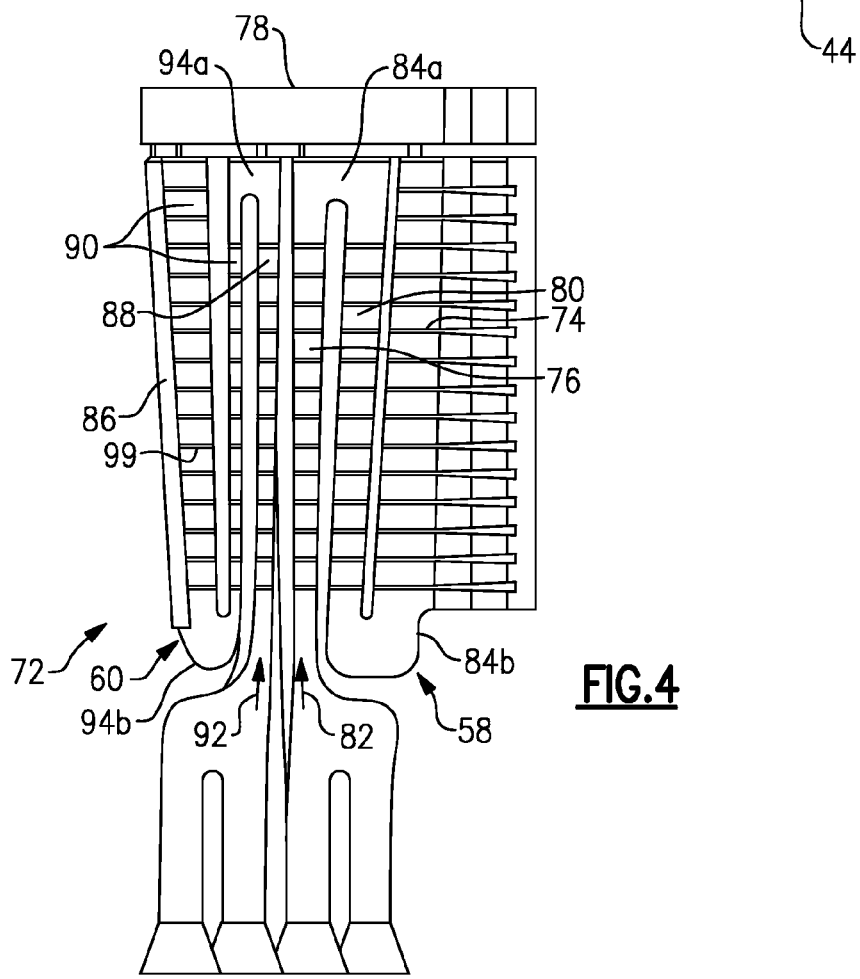
FIG. 4 illustrates an example core used to form the turbine blade, to illustrate cooling passages of the turbine blade.

FIG. 4 illustrates a core 72 used to form the turbine blade 22. That is, the turbine blade 22 is formed around the core 72, such as by using a casting technique. Subsequently, the core 72 is removed (e.g., by leaching), leaving the cooling passages 58 and 60 within the turbine blade 22. Thus, the core 72 represents a solid form of the passages 58 and 60 and is used herein to illustrate the shape of the passages 58 and 60 (e.g., a serpentine shape).

The aft cooling passage 58 includes a trailing end section 74 that is located near the trailing end 44 of the turbine blade 22, a first interior section 76 that is located near a midsection 78 (e.g., a mid-chord location between the leading end 42 and the trailing end 44) of the turbine blade 22, and a first intermediate section 80 between the trailing end section 74 and the first interior section 76. The first interior section 76 functions as an inlet for receiving the bleed flow 62, as represented by arrow 82. The first interior section 76 extends lengthwise between the base 38 to the tip 36 of the turbine blade 22 and transitions into the first interior section 76 through turn section 84a. The first intermediate section 80 extends lengthwise between the base 38 to the tip 36 from the turn section 84a to another turn section 84b, which provides a transition from the first intermediate section 80 into the trailing end section 74.

The forward cooling passage 60 also includes several sections. A leading end section 86 is located near the leading end 42 of the turbine blade 22, a second interior section 88 is located near the midsection 78 of the turbine blade 22, and a plurality of second intermediate sections 90 are located between the leading end section 86 and the second interior section 88. In the disclosed example, there are two of the second intermediate sections 90. However, in other examples, there may be additional second intermediate sections 90 or only one intermediate section 90, depending upon the design of the turbine blade 22.

The second interior section 88 functions as an inlet for receiving the bleed flow 62, as represented by the arrow 92. The second interior section 88 generally extends lengthwise between the base 38 to the tip 36 of the turbine blade 22 and transitions into the plurality of second intermediate sections 90 through a turn section 94a. The plurality of second intermediate sections 90 also include another turn section 94b. The forward one of the second intermediate sections 90 that is located near the leading end 42 of the turbine blade 22 is also connected with the leading end section 86 through a series of openings 95 (FIG. 3) along the length of the leading end section 86.

The turbine blade 22 includes an arrangement of coolant discharge openings 96 (FIG. 2), e.g. film cooling holes, that discharge the bleed flow 62 from the sections 74, 76, 80, 86, 88, or 90 such that the bleed flow 62 forms a film of relatively cool air over portions of the outer surface of the turbine blade 22 that protect the turbine blade 22 from the elevated temperatures of the hot gas stream from the combustion section 18. For example, at least a portion of the coolant discharge openings 96 include a constant area portion 97a and a tapered portion 97b that opens to the surface of the turbine blade 22. The tapered portion 97b facilitates discharging the bleed flow 62 over a greater surface area of the turbine blade 22, as well as producing a film of the bleed flow 62 over the surface rather than jetting the bleed flow 62 into the passing hot gas stream.

The particular arrangement of the coolant discharge openings 96 facilitates effective cooling of the outer surface of the turbine blade 22. For example, the temperature at different locations of the turbine blade 22 depends to a significant extent on the design of the blade 22. That is, the shape of the airfoil determines how the hot gas stream flows over the airfoil and thereby influences the temperature experienced at different locations. The number and size of internal cooling passages also influences the temperature. Thus, an arrangement of cooling discharge openings for one blade may not necessarily be applicable to blades having a different shape and different cooling passage design. The location of the various coolant discharge openings 96 of the turbine blade 22 will now be described with reference to the sections 74, 76, 80, 86, 88, and 90.

The leading end section 88 includes four sets of the coolant discharge openings 96, including coolant discharge opening sets 96a, 96b, 96c, and 96d (hereafter 96a-d). The sets 96a-d are arranged in a "shower head" formation. That is, the sets 96a-d discharge the bleed flow 62 in a variety of different directions relative to the pressure side 46 and the suction side 48. In the illustrated example, set 96a discharges to the suction side 48, and set 96d discharges to the pressure side 46. Sets 96b and 96c also discharge to the suction side 48. As can be appreciated from FIG. 2, each set 96a-d extends in a row between the tip 36 and the base 38. Thus, the sets 96a-d provide cooling along the leading end 42 of the turbine blade 22.

The forward one of the plurality of second intermediate sections 90 also includes a set 96e of the coolant discharge openings 96. The set 96e extends in a row between the tip 36 and the base 38. Likewise, the first intermediate section 80 of the aft cooling passage 58 also includes a set 96f of the coolant discharge openings 96 that extends in a row between the tip 36 and the base 38. The trailing end section 74 includes another set 96g of the coolant discharge openings 96 that discharge bleed flow 62 through the trailing end 44 of the turbine blade 22. The trailing end section 74 also includes pedestals 98 to provide turbulent flow through the coolant discharge openings 96 of set 96g. Likewise, the sections 74, 76, 80, 86, 88, and 90 may include trip strips 99 to mix the bleed flow 62 and facilitate uniform cooling of the turbine blade 22.

The illustrated arrangement of the sets 96a-g of the cooling discharge openings 96 facilitates cooling for the particular design of the turbine blade 22, which tends to experience a hot zone 100 on the pressure side 46 that extends span-wise between set 96d and set 96f. The temperature of a particular location on a turbine blade or the location of a hot zone may be predicted using a computer simulation or estimated after a period of service in an engine, for example. In this regard, sets 96d-f of the coolant discharge openings 96 provide a film of the bleed flow 62 over the surface of the pressure side 46 to cool the pressure side 46, including the hot zone 100. Set 96d discharges a film of the bleed flow 62 over the portion of the surface of the pressure side 46 between set 96d and set 96e. Set 96e discharges a film of the bleed flow 62 over the portion of the surface of the pressure side 46 between set 96e and set 96f, and set 96f discharges a film of the bleed flow 62 over the portion of the surface of the pressure side 46 between set 96f and the trailing end 44. Thus, sets 96d-f cool a substantial portion of the surface of the pressure side 46, including the hot zone 100 corresponding to the airfoil shape of the turbine blade 22.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:
1. A turbine component comprising:
an aft cooling circuit that extends between a turbine midsection and a turbine trailing end, the aft cooling circuit including a trailing end section proximate the trailing end, a first interior section proximate the turbine midsection, and a first intermediate section fluidly connected between the trailing end section and the first interior section; and
a forward cooling circuit that extends between the turbine midsection and a turbine leading end, the forward cooling circuit including a leading end section proximate the leading end, a second interior section proximate the turbine midsection, and a plurality of second intermediate sections fluidly connected between the leading end section and the second interior section, wherein the leading end section includes a plurality of first coolant discharge openings, the plurality of second intermediate section includes a plurality of second coolant discharge openings, the first intermediate section includes a plurality of third coolant discharge openings, and the trailing end section includes a plurality of fourth coolant discharge openings, wherein a forward-most one of the plurality of second intermediate sections includes the plurality of second coolant discharge openings and the remaining one or ones of the plurality of second intermediate sections are free of any coolant discharge openings.

2. The turbine component as recited in claim 1, wherein the plurality of first coolant discharge openings comprises four sets of discharge openings, each of the four sets of discharge openings being arranged in a row extending between a turbine base and a turbine tip.

3. The turbine component as recited in claim 2, wherein one of the four sets of coolant discharge openings opens to a turbine pressure side and another of the four sets of discharge openings opens to a turbine suction side.

4. The turbine component as recited in claim 1, wherein the plurality of second coolant discharge openings and the plurality of third coolant discharge openings each open to a turbine pressure side that is opposed to a turbine suction side.

5. The turbine component as recited in claim 1, wherein a portion of the plurality of first coolant discharge openings open to a turbine pressure side and another portion of the plurality of first coolant discharge openings opens to a turbine suction side.

6. The turbine component as recited in claim 1, wherein the plurality of second coolant discharge openings each include a constant cross-section portion and a tapered portion.

7. The turbine component as recited in claim 1, wherein each of the plurality of second coolant discharge openings opens in an aft direction toward the turbine trailing end.

8. The turbine component as recited in claim 1, wherein a portion of the plurality of first coolant discharge openings, all of the plurality of second coolant discharge openings, and the plurality of third coolant discharge openings open in an aft direction toward the turbine trailing end.

9. The turbine component as recited in claim 1, wherein each of the sections extends lengthwise between a turbine base and a turbine tip, and each of the sections is connected with an adjacent one of the sections through a turn section.

10. The turbine component as recited in claim 1, wherein the plurality of second intermediate sections includes a pair of second intermediate sections, one of the pair being adjacent the leading end section and the other of the pair being adjacent the second interior section.

11. The turbine component as recited in claim 10, wherein the one of the pair that is near the leading end section includes the plurality of second coolant discharge openings.

12. The turbine component as recited in claim 1, wherein the turbine component comprises a turbine blade.

13. The turbine component as recited in claim 1, wherein the aft cooling circuit and the forward cooling circuit extend within an airfoil section of a turbine blade, and the aft cooling circuit and the forward cooling circuit are not fluidly connected within the airfoil section.

14. The turbine component as recited in claim 1, wherein the plurality of second coolant discharge openings open to a turbine suction side.

15. The turbine component as recited in claim 1, wherein the first intermediate section and at least one of the plurality of second intermediate sections are free of any coolant discharge openings.

16. The turbine component as recited in claim 1, wherein the trailing end section, the first interior section and the first intermediate section of the aft cooling circuit and the leading end section, the second interior section and the plurality of second intermediate sections of the forward cooling circuit are all bounded by a turbine suction side wall.

17. A gas turbine engine system, comprising:
a combustion section; and
a turbine section downstream of the combustion section, the turbine section having a plurality of turbine components, each turbine component having an aft cooling circuit that extends between a turbine midsection and a turbine trailing end, the aft cooling circuit including a trailing end section proximate the trailing end, a first interior section proximate the turbine midsection, and a first intermediate section fluidly connected between the trailing end section and the first interior section, and a forward cooling circuit that extends between the turbine midsection and a turbine leading end, the forward cooling circuit including a leading end section proximate the leading end, a second interior section proximate the turbine midsection, and a plurality of second intermediate sections fluidly connected between the leading end section and the second interior section, wherein the leading end section includes a plurality of first coolant discharge openings, the plurality of second intermediate sections includes a plurality of second coolant discharge openings, the first intermediate section includes a plurality of third coolant discharge openings, and the trailing end section includes a plurality of fourth coolant discharge openings, and wherein a forward-most one of the plurality of second intermediate sections includes the plurality of second coolant discharge openings and the remaining one or ones of the plurality of second intermediate sections are free of any coolant discharge openings.

* * * * *